(12) United States Patent
Deepak et al.

(10) Patent No.: US 8,131,411 B2
(45) Date of Patent: Mar. 6, 2012

(54) CHANGE OVER VALVE FOR A TRANSITION SYSTEM

(75) Inventors: Kumar Deepak, Kingston (CA); John Sullivan, Oswego, NY (US); Michael J. Spadaccini, Dexter, NY (US)

(73) Assignee: New York Air Brake Corporation, Watertown, NY (US)

(*) Notice: Subject to any disclaimer, the term of this patent is extended or adjusted under 35 U.S.C. 154(b) by 672 days.

(21) Appl. No.: 12/207,644

(22) Filed: Sep. 10, 2008

(65) Prior Publication Data
US 2009/0069961 A1   Mar. 12, 2009

Related U.S. Application Data

(60) Provisional application No. 60/971,338, filed on Sep. 11, 2007.

(51) Int. Cl.
G05D 3/00 (2006.01)
B60T 13/00 (2006.01)

(52) U.S. Cl. ........................................................ 701/20
(58) Field of Classification Search .................... 701/19, 701/20; 303/3, 7, 8, 15
See application file for complete search history.

(56) References Cited

U.S. PATENT DOCUMENTS

| 6,217,126 B1 | 4/2001 | Kull et al. | |
| 6,286,913 B1 * | 9/2001 | Mazur et al. | 303/15 |
| 6,474,150 B1 * | 11/2002 | Berg et al. | 73/121 |
| 6,676,229 B1 * | 1/2004 | Marra et al. | 303/7 |

* cited by examiner

*Primary Examiner* — S. Joseph Morano
*Assistant Examiner* — Robert McCarry, Jr.
(74) *Attorney, Agent, or Firm* — Barnes & Thornburg LLP

(57) ABSTRACT

The present interface system includes a controller monitoring pressure on a locomotive brake pipe port, controlling pressure on a train brake pipe port in response to the pressure on a locomotive brake pipe port, providing ECP commands on an ECP trainline via a train electrical terminal in response to the pressure on the locomotive brake pipe port, and providing electrical power on the ECP trainline via an train electrical trainline terminal from the locomotive electrical trainline terminal. The system includes a three position change over valve. The system also includes a wireless display unit which communicates via a transceiver with the controller and displays information from the controller to the operator remote from the interface system.

4 Claims, 2 Drawing Sheets

CHANGE OVER VALVE FOR A TRANSITION SYSTEM

CROSS-REFERENCE TO RELATED APPLICATIONS

This application is a Utility Application based upon and claiming the benefit of priority to U.S. Provisional Application 60/971,338, filed on Sep. 11, 2007, the contents of which are incorporated herein by reference.

BACKGROUND AND SUMMARY OF THE INVENTION

Field of Invention

The present invention relates generally to railway pneumatic brake systems and, more specifically, to an interface between a pneumatic train brake control system and a train of electrically controlled pneumatic (ECP) brake equipped cars.

The freight train industry in the U.S. is transitioning from a completely pneumatically-controlled train to a train having ECP brake equipment on their cars. For the foreseeable future, not all locomotives will have the capability of interfacing with an ECP equipped train. They do not have the ability to provide the necessary power or electric control signals to the individual cars nor to control the brake pipe as required by the ECP cars. As presently configured, the train brake pipe is maintained at its charged value and is only used as a pneumatic back-up for failure of the ECP electrical control signals.

To meet this demand, various systems have been suggested. A limp-in control arrangement for ECP systems is described in U.S. Pat. No. 6,286,913. An interface which provides the appropriate level of power to the ECP trainline is described in U.S. Pat. No. 6,217,126. A locomotive to ECP brake conversion system which provides the appropriate power and control signals to the car trainline is described in U.S. Pat. No. 6,189,980. Another interface system is shown in U.S. Pat. No. 6,676,229.

The present interface system includes a controller monitoring pressure on a locomotive brake pipe port, controlling pressure on a train brake pipe port in response to the pressure on a locomotive brake pipe port, providing ECP commands on an ECP trainline via a train electrical terminal in response to the pressure on the locomotive brake pipe port, and providing electrical power on the ECP trainline via an train electrical trainline terminal from the locomotive electrical trainline terminal. The system further includes a pair of brake pipe connectors and a change over valve. The change over valve has first and second positions for reversing the connection of the brake pipe connectors to the locomotive and train brake pipe ports and has a third position for disconnecting the brake pipe connectors from the locomotive and train brake pipe ports and directly connecting the brake pipe connectors to each other.

The change over valve includes a rotary manual actuator for selecting the positions of the valve. The first and second positions are 180 degrees apart and the third position is between the first and second position. The actuator has an arrow which is positioned to point in the direction of the brake connector which is connected to the locomotive brake pipe.

These and other aspects of the present invention will become apparent from the following detailed description of the invention, when considered in conjunction with accompanying drawings.

DETAILED DESCRIPTION OF THE PREFERRED EMBODIMENTS

Figure 1:
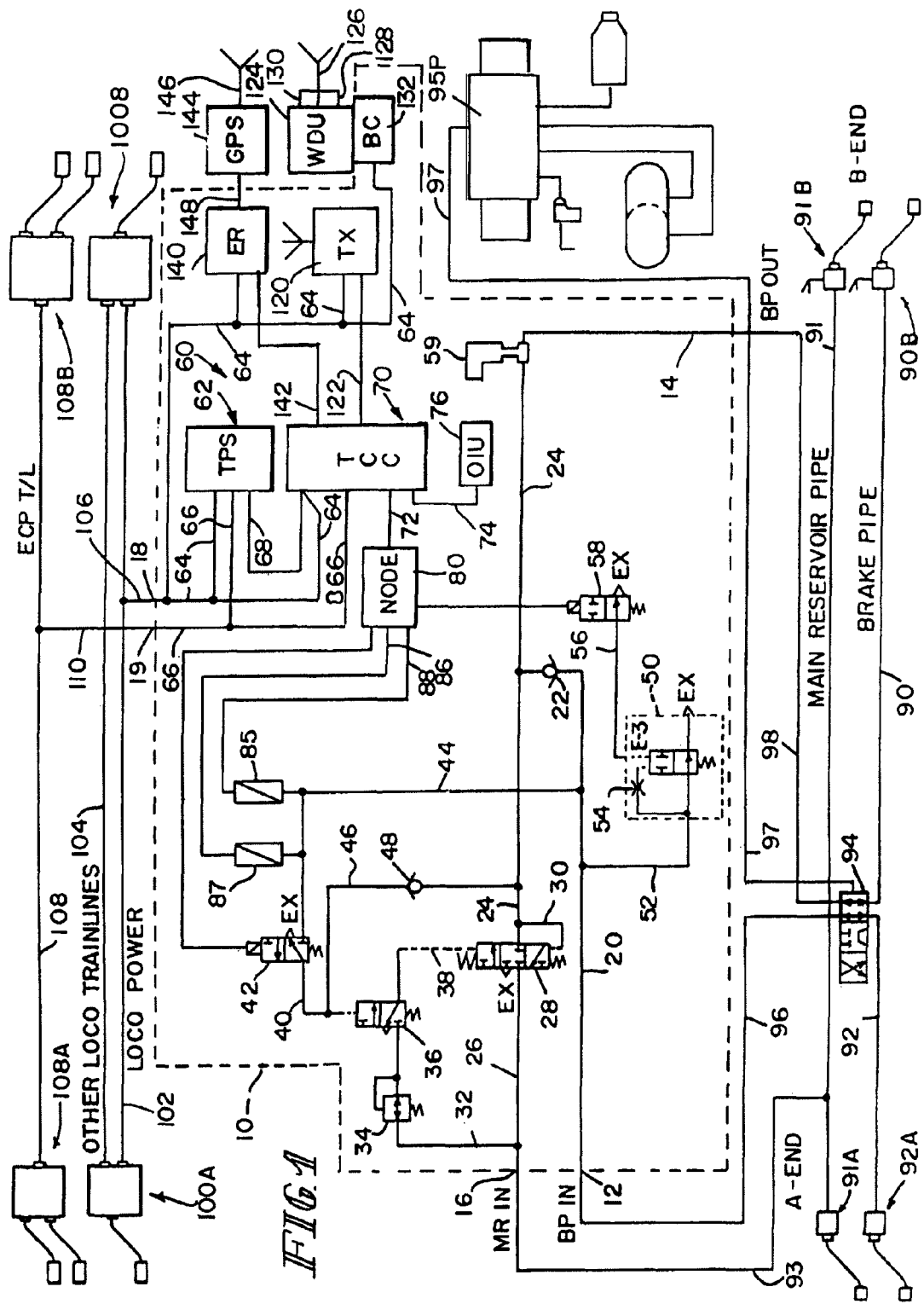
FIG. 1 is a schematic of an embodiment of an interface system incorporating the principles of the present disclosure.

FIG. 1 illustrates an interface system 10 for interfacing a pneumatic train brake control system to a train of electrically-controlled pneumatic (ECP) brake equipped cars. The interface 10 includes a locomotive brake pipe port 12, a train brake pipe port 14, and a locomotive main reservoir pressure supply port 16. It also includes a locomotive electrical trainline terminal 18 and a train electrical trainline terminal 19. The interface system 10 monitors pressure on the locomotive brake pipe port 12 and controls the pressure on the train brake pipe port 14 in response to pressure on the locomotive brake pipe port 12. The interface 10 also provides ECP commands on the train electrical trainline terminal 19 in response to pressure on the locomotive brake pipe port 12 and provides electrical power on the train electrical trainline terminal 19 from the locomotive electrical trainline terminal 18.

The locomotive brake pipe port 12 is connected to the train brake pipe port 14 by line 20, check valve 22 and line 24. The locomotive supply port 16 is connected to line 24 by line 26 and a train brake pipe valve 28. The train brake pipe valve 28 is shown as a three-position relay valve in its lap position. The relay valve 28 compares the pressure on the train brake pipe line 24 via line 30 against the pilot signal on line 38. The pilot signal on 38 is provided from the locomotive supply port 16 via line 32, a feed or pressure regulating valve 34 and a valve 36. The valve 36 is controlled via a signal on line 40, which is connected to the locomotive brake pipe port 12 and line 20 via line 44 and electropneumatic valve 42. The electropneumatic valve 42 is electrically controlled to connect the pressure on the locomotive brake pipe port 12 to move valve 36 from its shown exhaust position to a through position. This allows the regulated pressure from the locomotive supply port 16 to be applied to line 38 to pilot the relay valve 28.

The train brake pipe port 14 is also connected via line 24, check valve 48 and line 46 to the control input of valve 36. During charging, the check valve 48 is closed since the output of relay valve 28 is higher than the pressure on lines 46 and 40 (locomotive brake pipe port 12). If the pressure at the train brake pipe port 14, after charging, drops below that on lines 40 and 46, which is generally below the locomotive brake pipe port 12, check valve 48 will open. A vent valve 59 is also connected to the train brake pipe port 14 to sense an emergency condition and accelerate the blow down of the car brake pipe port pressure.

Interface 10 also includes a locomotive emergency valve. This valve includes a pneumatic valve 50 connected to the locomotive brake pipe port 12 via lines 52 and 20. Valve 50 is shown connecting the locomotive brake pipe port 12 to exhaust. When the pressure in the locomotive brake pipe port 12 is high enough via line 54, valve 50 moves down disconnecting line 52 from exhaust. A second control signal on line 56 from electropneumatic valve 58 also controls the position of emergency valve 50. Valve 58 receives its signals from the controller 60 to connect and disconnect line 56 from exhaust. If the controller 60 should fail, valve 58 will assume this exhaust position producing an emergency condition. The controller 60 also initiates power (throttle) cut-off on the locomotive(s) in response to an emergency.

The controller 60 in FIG. 1 is illustrated as including a trainline power supply module 62 connected to the locomotive electrical trainline terminal 18 via wire 64 and to the train electrical trainline terminal 19 via wire 66. It also provides a connection via line 68 to a trainline communications controller 70. Trainline communications controller 70 is also connected to the locomotive electrical trainline terminal 18 via wire 64 and to the train electrical trainline terminal 19 via wire 66. The trainline power supply module 62 and the trainline communications controller 70 are products available from New York Air Brake Corporation. Similar equivalent systems may be used and are a part of the known control systems in the locomotive for the ECP brake systems in a train. These systems take power from the locomotive electrical trainline terminal 18 and provide power and control signals on the car electrical trainline terminal 19 and the ECP trainline 108. The trainline communications controller 70 monitors the pressure at the locomotive brake pipe port 12 via transducers 85 and 87 and provides electrical control of electropneumatic valves 42 and 58 and converts this pressure to ECP trainline brake commands.

In this embodiment an input/output node 80 is connected to the trainline communications controller 70 via line 72. The node 80 is connected to electropneumatic valve 42 via line 82 and to electropneumatic valve 58 via line 84. The node 80 is also connected to two transducers 85 and 87 via lines 86 and 88, respectively. The transducers 85 and 87 monitor the conditions in line 44, which is connected via line 20 to the locomotive brake pipe port 12. An operator interface unit 76 is connected via line 74 to the trainline communications controller 70. This provides an operator display for train set-up and other functions. Depending upon the type of modules 70 used, node 80 may be eliminated and the connection to module 70 be made direct.

The elements of the system so far described are the same as in U.S. Pat. No. 6,676,229 and reference should be made thereto for complete explanation of their operation. U.S. Pat. No. 6,676,229 is incorporated herein by reference.

The interface system 10 mounted to a car having an A-end and a B-end. This is by way of example, and the terminals and ports of the interface system 10 may be connected individually to the appropriate locomotive and car terminals and connectors. A first brake pipe portion 90 is connected to a B-end connector 90B, and a second brake pipe portion 92 is connected to an A-end connector 92A. A change over valve 94 allows reversing the connection of the brake pipe portions 90 and 92 to the locomotive brake pipe port 12 and the car/train brake pipe port 14 via lines 96 and 98, respectively. The change over valve is a three position valve compared to the two position transition valve discussed in U.S. Pat. No. 6,676,229. The first two positions of the change over valve are the same as the two positions of the transition valve. The third position of the change over valve is a direct connection of the two brake pipe portions 90 and 92. This allows the locomotive brake pipe to control the car/train brake pipe for a standard pneumatic train.

In the position shown for the change over valve 94, the locomotive is at the A-end and its brake pipe connected at connector 92A, and the car at the B-end having its brake pipe connected to connector 90B. When the transition valve 94 is moved to the second position, the locomotive is at the B-end, and the car is at the A-end. In the first and second positions, the change over valve 94 isolates the two brake pipe portions 90 and 92. In the third position, the change over valve disconnects the locomotive brake pipe port 12 and the car/train brake pipe port 14 from the brake pipe portions 90 and 92 and directly connect the two brake pipe portions 90 and 92.

Figure 2:
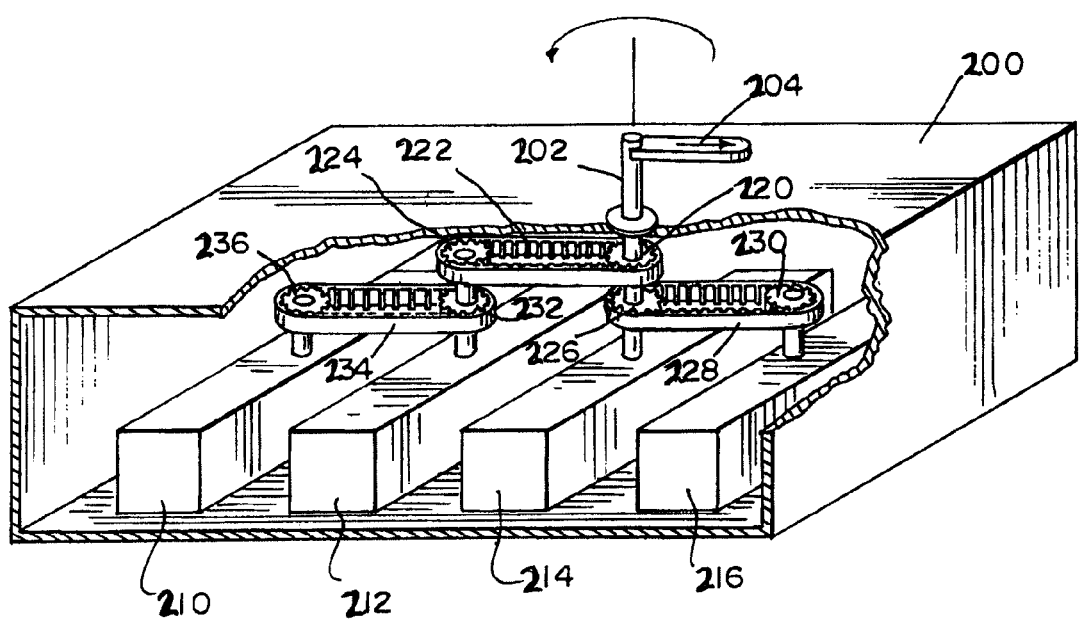
FIG. 2 is a perspective view, partially cut away, of an embodiment of the change over valve incorporating the principles of the present disclosure.

FIG. 2 illustrates an example of the change over valve 94. It includes a body 200 having ports (not shown) connected to brake pipe portions 90 and 92 at the A and B end of the car and to lines 96, 97 and 98 of the interface system 10. The change over valve 94 includes a rotary manual actuator 202 for selecting the position of the change over valve. The first and second positions are 180° apart and the third position is between the first and second positions. The actuator 202 includes an arrow 204 which is positioned to point in the direction of the brake connector of brake pipe portion which is connected to the locomotive brake pipe. When the changeover valve 94 is mounted horizontally, the arrow 204 will be horizontal pointing to the appropriate end of the vehicle to which the system 10 is mounted. For the third position, when the brake pipe portions 90 and 92 are connected directly, the arrow will point vertically upward.

In the example shown for the change over valve 94, four valve elements 210, 212, 214 and 216 are shown. The handle 202 is connected to the actuator for the valve element 214 and includes a gear 220 connected by a belt 222 to a gear 224 connected to the actuator for the valve element 212. The actuator for the valve element 214 and includes another gear 226 connected by a belt 228 to a gear 230 connected to the actuator for the valve element 216. The actuator for the valve element 212 and includes another gear 232 connected by a belt 234 to a gear 236 connected to the actuator for the valve element 210.

The locomotive supply port 16 is connected to a supply line 91 having connectors 91A and 91B. As illustrated and known in the industry, this is the main reservoir pipe of a locomotive consist.

The car illustrated in FIG. 1 has a standard pneumatic or conventional brake control valve 95P. It is connected by line 97 to the locomotive brake pipe port 12 by the change over valve 94 in all three of its positions. Thus the brake control valve 95P is responsive to the pressure on the locomotive brake pipe from the locomotive side for all positions of the change over valve 94. A standard pneumatic or conventional system 95P includes a pneumatic brake control valve, a pair of reservoirs, a retainer and a brake cylinder. All of these are shown but not marked, since they are well known. This provides a brake set on the car to which the interface system 10 is mounted. An EPC brake control valve may also be used as shown in FIG. 2 of U.S. Pat. No. 6,676,229, which is incorporated herein by reference.

For the electrical connections, electrical connectors 100A and 100B provide interconnection to the locomotive consist. Schematically, the locomotive power line 102 is shown, and the remainder of the locomotive trainlines are shown by a single line 104. These lines are the MU multi-unit lines well known in the freight industry. Locomotive power line 102 is connected via line 106 to the locomotive electrical trainline terminal 18 of the interface system 10. Train electrical trainline connectors 108A and 108B have an ECP trainline 108 there between to be connected to the train electrical trainline terminal 19. The ECP trainline 108 is connected via wire 110 to the train electrical trainline terminal 19.

The present interface system 10 includes a transceiver 120 connected to the TCC via line 122. It is also powered via line 64. The transceiver 120 provides wireless communication with the controller 60. A wireless display unit WDU 124 communicates via the transceiver 120 with the controller 60 and displays information from the controller 60 to the operator of the locomotive remote from the interface system 10.

The wireless display unit 124 includes an antenna 126 removably mounted to the display unit by a mount 128 and electrically connected via line 130. The mount 128 allows the antenna 126 to be separated physically demounted from wireless display unit 124 and mounted to the vehicle to which the operator carries it. This is generally the lead locomotive. The mount 128 may be any well-known device, for example, a magnet. Suction cups or other devices may be used. The wireless display unit 124 includes a chargeable power supply, for example, a battery. The interface includes a charger 132 connected via line 64 to the source of power. The battery may be removed from the display unit 124 and connected to the charger 132 or the display unit 124 can have a terminal which mates with the charger 132.

Although the present system has been described and illustrated in detail, it is to be clearly understood that this is done by way of illustration and example only and is not to be taken by way of limitation. The scope of the present system is to be limited only by the terms of the appended claims.

What is claimed:

1. An interface system for interfacing a pneumatic train brake control system to a train of electrically controlled pneumatic (ECP) brake equipped cars, the interface system comprising:

a controller monitoring pressure on a locomotive brake pipe port, controlling pressure on a train brake pipe port in response to the pressure on a locomotive brake pipe port, providing ECP commands on an ECP trainline via a train electrical terminal in response to the pressure on the locomotive brake pipe port, and providing electrical power on the ECP trainline via an train electrical trainline terminal from the locomotive electrical trainline terminal;

a pair of brake pipe connectors; and a change over valve having first and second positions for reversing the connection of the brake pipe connectors to the locomotive and train brake pipe ports and having a third position for disconnecting the brake pipe connectors from the locomotive and train brake pipe ports and directly connecting the brake pipe connectors to each other wherein the change over valve includes four valve elements having actuators connected to each other and a handle of the change over valve by gears and belts.

2. The system according to claim 1, wherein the change over valve includes a rotary manual actuator for selecting the positions of the valve, the first and second positions are 180 degrees apart and the third position is between the first and second position.

3. The system according to claim 2, wherein the actuator has an arrow which is positioned to point in the direction of the brake pipe connector which is connected to the locomotive brake pipe.

4. The system according to claim 1, including a brake control valve responsive to locomotive brake pipe pressure to control brakes on the system; and wherein the change over valve connects the brake control valve to the brake pipe connector connected to the locomotive brake pipe for all three positions of the change over valve.

* * * * *